Jan. 26, 1960  J. W. GRAY  2,922,224
NAVIGATION SYSTEM EMPLOYING STAR HEADING REFERENCE
Filed Jan. 24, 1955  2 Sheets-Sheet 2

INVENTOR.
JOHN W. GRAY
BY
ATTORNEY.

United States Patent Office 2,922,224
Patented Jan. 26, 1960

2,922,224

NAVIGATION SYSTEM EMPLOYING STAR HEADING REFERENCE

John W. Gray, Pleasantville, N.Y., assignor to General Precision Laboratory Incorporated, a corporation of New York Application January 24, 1955, Serial No. 483,695

8 Claims. (Cl. 33—1)

This invention relates to determination of the heading of an aircraft or other vehicle by the use of a celestial heading reference. More specifically this invention relates to navigation by the dead reckoning method with the aid of star observations, the instrumentation being automatic and contained within the craft.

Dead reckoning navigation and avigation require an accurate knowledge of heading, which is usually secured either by the use of a magnetic compass or by celestial observation. Magnetic compasses fail in the regions of the earth's poles and are unreliable in some other regions. Celestial observation fails under overcast conditions. If a star tracker be employed it generally is pointed to the star initially by use of an auxiliary reference such as magnetic compass. Therefore the inclusion of both kinds of heading reference in aircraft navigation equipment is desirable.

This invention provides a combination of aerial navigation components including a magnetic compass, a gyroscopic stabilizer, a spherical triangle solver, and a star tracker. The space rigidity and integrating properties of the gyroscope are highly desirable in applying heading reference data because of the unstable nature of an aircraft platform, and are necessary to provide output data continuity in the event of temporary or momentary failure of all heading references. The spherical triangle solver computes the azimuth and altitude of the tracked star from the known present latitude and longitude of the aircraft and the known position of the star.

The principal purpose of this invention is to provide a star tracker for use as a heading reference in combination with an aerial navigation instrument.

Another purpose of this invention is to provide a device for use in finding present position error.

A further understanding of this invention may be secured from the detailed description and the drawings, in which.

Figure 1:
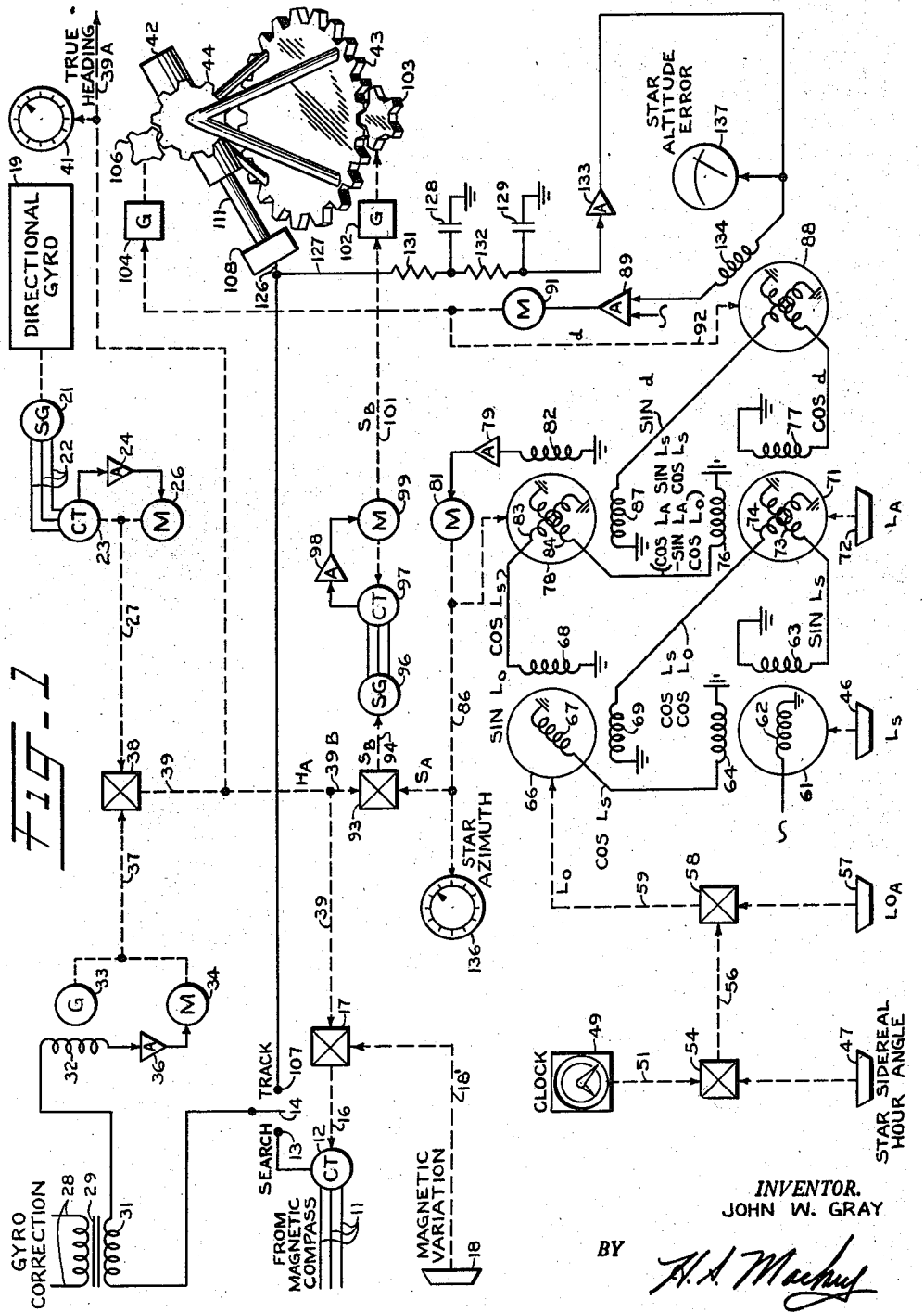
Figure 1 is a schematic diagram of the circuit of the invention.

Referring now to Fig. 1 a magnetic compass (not shown) furnishes magnetic heading data through a three-phase data transmission line, represented by the three conductors 11, to a control transformer 12. The output winding of the control transformer is connected to a terminal 13 of a manual switch 14. The rotor of the control transformer 12 is positioned through a shaft 16. A differential gear 17 is provided for the addition of the magnetic variation angle by means of an input knob 18.

A directional gyroscope 19 is provided to smooth the magnetic data and to furnish data continuity when the heading reference is cut off for short periods. The directional gyroscope 19 furnishes its data through a synchro transmission system including a generator 21, conductors 22 and control transformer 23 to a position servomechanism including amplifier 24 and motor 26. The motor 26 therefore positions the shaft 27 in accordance with the azimuthal position of gyroscope 19.

The directional gyroscope 19 has the property of rigidity in space in the azimuth plane. In order to convert its indications to constant azimuth indications a correction must be added for earth sidereal rotation, for aircraft longitude rate, and for aircraft latitude. These combined corrections are applied through conductors 28 to the transformer 29, the secondary winding 31 of which is connected to the winding 32 of a tachometer generator 33. This generator is connected to a motor 34 and amplifier 36 to form a rate servomechanism having an output shaft 37.

In order to form a magnetic heading servo loop the secondary winding 31 is also connected to switch 14. The shafts 37 and 27 are connected to a differential 38 which adds the rotation of shaft 37 to the angular deflection of shaft 27 to form at output shaft 39 aircraft true heading or azimuth angle relative to true north. This shaft angle is algebraically added to the magnetic variation angle by connecting shaft 39 to the differential gear 17, to which the magnetic variation inserted by knob 18 is also applied through shaft 18'. The output deflection of shaft 16 should therefore represent magnetic heading. If, however, its deflection differs from magnetic heading an error voltage appears at switch terminal 13. When the switch 14 is connected to this terminal 13 this error voltage is applied in series with transformer secondary winding 31 and the tachometer generator output to amplifier 36, causing a change in the rate servo output of such sense as to correct the error in shaft 16.

The compass and directional gyroscope thus maintain the output shaft 39 at true heading, which may be indicated at an instrument 41 and otherwise utilized at a mechanical output terminal 39A.

A star tracking telescope 42 is mounted for rotation in azimuth on a geared platform 43 and is provided with a trunnion gear 44 for elevation rotation. The mount is supplied with star azimuth and star elevation data, continuously and automatically amended, so that it is always aimed at the selected star. The star azimuth and elevation data are secured by the operation of a triangle solver supplied with astronomical and present position data.

Figure 2:
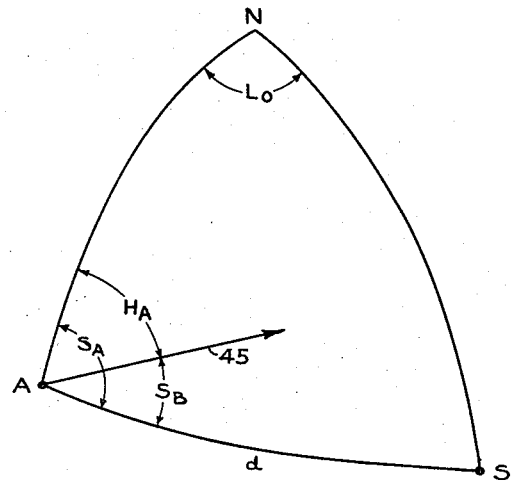
Figure 2 illustrates the spherical triangle which is solved by the device of the invention.

The triangle which is solved is illustrated in Fig. 2. This triangle represents the relations on the surface of the earth of the present position A of the aircraft, the north pole N, and the geographical position S of the star, which is the point on the surface of the earth where the star is viewed as directly overhead. The sides AN and NS represent meridians, and the angle $Lo$ is the difference between present position longitude $Lo_A$ and star geographical position longitude $Lo_S$. The side $d$ of the spherical triangle represents the great circle path between aircraft present position A and star geographical position S. The angle NAS is denoted by $S_A$ and is termed the star azimuth. The aircraft is headed in the direction of the arrow 45 and its meridian angle $H_A$ is the aircraft true heading. The difference between $S_A$ and $H_A$ is the bearing of the star geographical position relative to the aircraft heading direction and is denoted by $S_B$. Present position latitude and star geographical position latitude are indicated below by $L_A$ and $L_S$ respectively.

The solution of the triangle ANS depends on the following six spherical triangle identities:

$$Lo_S - Lo_A = Lo \qquad (1)$$

$$\cos d = \sin L_A \sin L_S + \cos L_A \cos L_S \cos Lo \qquad (2)$$

$$\cos S_A \sin d = \cos L_A \sin L_S - \sin L_A \cos L_S \cos Lo \qquad (3)$$

$$\sin S_A \sin d = \cos L_S \sin Lo \qquad (4)$$

$$\frac{\cos L_S \sin Lo}{\cos L_A \sin L_S - \sin L_A \cos L_S \cos Lo} = \frac{\sin S_A \sin d}{\cos S_A \sin d} = \tan S_A \quad (5)$$

$$\sqrt{(\sin S_A \sin d)^2 + (\cos S_A \sin d)^2} = \sin d \quad (6)$$

Equations 2, 3 and 4 are derived directly from the laws of sines and cosines for spherical triangles, while Equations 5 and 6 are derived from Equations 3 and 4.

Star geographical position latitude is set in from tables by means of an input knob 46, Fig. 1. This datum is constant or nearly so. Star longitude is defined as the distance in longitude degrees between the star geographical position and the Greenwich meridian. It is made up of two parts. The first part is the star sidereal hour angle, which is the angle between two lines from the earth, one to the star and the other to the reference point in the heavens known as the first point of Aries, i.e., the Vernal equinox. The star sidereal hour angle is constant for a given star and is set in from tables by knob 47. The second part of star longitude consists of the angle between the meridian of Greenwich and the first point of Aries. This angle is set in by a sidereal-time clock 49. The angular deflection set in and maintained by the clock 49 is applied through shaft 51 to a differential 54, where it is algebraically added to the angular deflection set in by knob 47 to form at its output shaft 56 an angle representing the star longitude. The present position longitude is set in by knob 57 and is algebraically added to the star longitude in differential 58 to form at its output shaft 59 an angular deflection representing longitude difference, which is the angle $Lo$ in Fig. 2.

Although knob 57 indicates that present position longitude is manually inserted, it may alternatively be inserted by a dead reckoning computer. The latter procedure in fact is preferable, as in general present position longitude continuously changes.

The data given for the solution of the spherical triangle of Fig. 2 consist of star geographical position latitude and longitude, and present position latitude and longitude. The triangle is solved for star azimuth, $S_A$, and the side $d$. The solution is instrumented by a triangle solver consisting of five resolvers and has a power input at any convenient frequency, such as 60 c.p.s. or 400 c.p.s., and two shaft angular deflections as outputs.

The first resolver 61 has electrical power connected to its rotor winding 62 and is positioned by the $L_S$ knob 46. Its orthogonal output windings 63 and 64 therefore generate electrical quantities representing by their magnitudes $\sin L_S$ and $\cos L_S$.

The resolver 66 is positioned by shaft 59 to an angle representing $Lo$. Its rotor winding 67 is excited by voltage from winding 64 representing $\cos L_S$. The output voltages excited in windings 68 and 69 therefore represent $\cos L_S \sin Lo$ and $\cos L_S \cos Lo$.

The resolver 71 is positioned at an angle representing present position latitude by a knob 72, the data being either inserted manually or automatically and continuously by a dead reckoning computer. One rotor winding 73 is excited from winding 63 by voltage representing $\sin L_S$ while the other rotor winding 74 is excited from winding 69 by voltage representing $\cos L_S \cos Lo$. The output winding 76 therefore generates a voltage representing $$\cos L_A \sin L_S - \sin L_A \cos L_S \cos Lo$$

The other output winding 77 produces a voltage representing $\sin L_A \sin L_S + \cos L_A \cos L_S \cos Lo$ which, in accordance with Equation 2 equals $\cos d$.

The combination of resolver 78 with amplifier 79 and motor 81 constitutes an arc tangent solver. In operation the resolver output winding 82 applies an input signal to amplifier 79 and the resulting motor 81 rotation rotates the resolver until the signal becomes or approximates zero. It is then obvious that the net field effect at winding 82 is zero and that the field components in the direction of winding 82 generated by rotor windings 83 and 84 are equal. This equality can be indicated by $$E_1 \cos a = E_2 \sin a \quad (7)$$

or $$\frac{E_1}{E_2} = \frac{\sin a}{\cos a} \quad (8)$$

in which $a$ is the shaft angle, $E_1$ is the voltage $$\cos L_S \sin Lo$$

applied to winding 83, and $E_2$ is the voltage $$\cos L_A \sin L_S - \sin L_A \cos L_S \cos Lo$$

applied to winding 84. From Equations 4 and 3 these voltages are equal to $\sin S_A \sin d$ and $\cos S_A \sin d$ respectively. Substituting in 8

$$\frac{\sin S_A \sin d}{\cos S_A \sin d} = \frac{\sin a}{\cos a} \quad (9)$$

from which it is seen that the angle $a$ has the value $S_A$. The angle of output shaft 86 at null therefore represents the star azimuth, $S_A$. The voltage $E_T$ in output winding 87 represents the sum of the component fields, or $$E_T = E_1 \cos a + E_2 \sin a \quad (10)$$

Since these components are at right angles to each other the value of $E_T$ is the square root of the sum of the squares of the components which, in accordance with Equation 6, reduces to $\sin d$.

The combination of resolver 88, amplifier 89 and motor 91 constitutes a second arc tangent solver. Application of Equation 8 to its input data shows that the deflection of its output shaft 92 represents the magnitude of the side $d$ of the spherical triangle of Fig. 2.

The star azimuth represented by the deflection of shaft 86 is algebraically added in differential 93 to aircraft true heading, represented by the deflection of shaft 39B, to form star relative bearing in output shaft 94. This is the angle between aircraft heading and the great circle between the aircraft and the star geographical position, and is denoted by $S_B$ in Fig. 2. This is the horizontal angle to which the telescope 42 must be set relative to the aircraft on which it is based. Accordingly the rotation of shaft 94 is amplified in power by application to a synchro transmission system including synchro generator 96 and control transformer 97, and from the latter to a position servomechanism including amplifier 98 and motor 99 provided with an output shaft 101. The interposition of the synchro transmission system affords the additional advantage of allowing the telescope to be positioned at a distance from the triangle solver. The rotation of shaft 101 is applied through gears 102 and pinion 103 to the azimuth gear 43 of the telescope mount.

The distance $d$, Fig. 2, in angular measure is the complement of the star's altitude angle, or its angular distance above the horizontal plane. The angular deflection $d$ of shaft 92 is therefore applied to the elevation gear 44 of the telescope through gears 104 and pinion 106. The angle $d$ is changed to the star altitude angle $S_h$ merely by a shift of 90° of the zero adjustment of pinion 106.

The telescope 42 is thus initially pointed in the general direction of the selected star by means of magnetic compass data when the switch 14 is put in its "search" position, namely, in engagement with contact terminal 13. Although the switch 14 is here described and shown as manually operated it may obviously be made automatically responsive to the stability of the magnetic compass signal and to the intensity of the star tracker signal. When the switch 14 engages contact 13 the true heading output data in shaft 39A is under control of the magnetic compass, and the star tracker is not part of the true heading servo loop. When, however, the switch 14 engages contact 107 the true heading shaft 39A is under control of the star tracker and the magnetic compass heading reference does not control the true heading servo loop.

Figure 3:
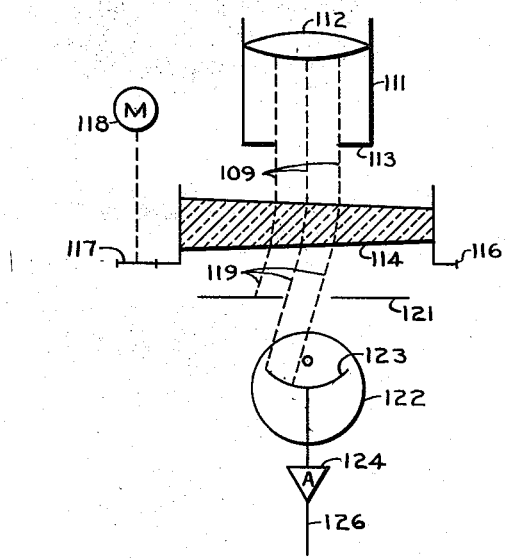
Figure 3 illustrates the construction of a star tracker used in connection with the invention.

The construction of the star tracker is indicated in Fig. 3 as one instrumentation of the rectangle 108, Fig. 1. The rays 109 represent the parallel light from a star being tracked after passing through the telescope eyepiece 111 containing the ocular lens 112. If the star is centralized in the telescope field the rays 109 are parallel to the telescope axis and are defined by the aperture 113. After emerging from the aperture these rays pass through a glass disc 114 having a wedge-shaped cross section and positioned with its axis preferably but not necessarily in the extended telescope axis. The disc 114 is rotatably held and is provided with a circumferential gear 116 which is meshed with a pinion 117. The pinion is driven by a synchronous motor 118 at a selected rate. Since the disc 114 is wedge-shaped along one diameter it refracts the light beam as indicated at 119 so that it is eccentric relative to a mask 121. Beneath this mask and concentric with the aperture there is positioned a photoelectric transducer which may be, for example, a phototube 122 having a photosensitive cathode 123. The phototube output is suitably amplified in amplifier 124.

In operation, when the telescope beam is parallel to its axis, the path of the light beam 119 as the disc 114 rotates is concentric with the extended telescope axis and with the cathode 123. The phototube output is therefore a direct current having no alternating current component. When, however, the beam 109 is at an angle to the telescope axis, the spot of light striking cathode 123 rotates eccentrically therewith and gives rise to an alternating component in the output of the phototube which increases in potential as the eccentricity increases. It is this alternating current output which is employed as an error signal. Its phase depends on the phase of the disc 114 which in turn is controlled by the phase of the current supplying motor 118.

This alternating current error signal is applied to output conductor 126, Figs. 1 and 3, and when switch 14, Fig. 1, is thrown to "track" by engaging contact 107 the error signal is applied in series with transformer winding 31 and generator winding 32 to amplifier 36. The alternating current power supply to amplifier 36 is taken from the same source that drives motor 118, Fig. 3, and the gearing of disc 114 is so arranged that the frequency of the signal output of phototube 122 is the same as the frequency of the amplifier 36 power supply, with phase controlled as stated. In addition, the power supply to the gyro correction conductors 28 and to generator 33 is from the same alternating current source. Under these conditions the phase of the tracker signal applied to amplifier 36 is detected thereby and the magnitude of the tracker signal is added to or subtracted from the other signals actuating the amplifier, with the result that the speed of the rate servo is increased or decreased as required. This speed change acts to correct the signal applied through shaft 39B, differential 93, shaft 94, the position servomechanism, and shaft 101 to the pinion 103 and azimuth gear 43 of the star tracker, the sense being such as to bring the star image in the telescope toward the vertical diameter of its field and to bring the azimuth error signal toward zero. In this process the shaft 39A is positioned to true heading.

It is obvious that rotation of the telescope mount in azimuth will correct any eccentricity of the light beam in that plane only and not in elevation. For example, if the telescope tube in Fig. 3 be moved in the plane of the paper it can be made to center the rotating beam 119 on tube 122 in the plane of the figure, but will have no effect on a non-central condition in the plane perpendicular to the paper.

In order to move the telescope in elevation it is necessary to change the phase of the error signal by 90°, this being equivalent to a 90° phase shift in the rotation of disc 114. This is done by connecting the error signal output 126 through conductor 127 to a phase retarding network consisting of condensers 128 and 129 and resistors 131 and 132. The phase-shifted output is applied through an amplifier 133 to the servomechanism feed-back loop of the arc tangent solver comprising resolver 88, where the signal is effectively in series with the voltage generated in the secondary positioning winding 134. The servo amplifier 89 is supplied with alternating current from the same source as motor 118, Fig. 3, as a phase reference, so that the output $d$ and its complement $S_h$ are corrected in accordance with the magnitude and phase sense of the altitude error signal. This not only maintains the star in the field, but also, because it centralizes the star in elevation, maintains maximum azimuth error signal strength. The maintenance of accurate aim of the telescope in elevation thus contributes to an azimuth error signal of maximum sensitivity and thus is conductive to the production of a true heading signal having minimum probable error.

The star altitude error can be employed to test the accuracy of the aircraft present position data, because the deflection of shaft 92 is proportional to the length of side $d$ of the spherical triangle, Fig. 2, when the proper shaft zero is taken. Thus any altitude error indicates error in the distance $d$ between aircraft present position and the star's geographical position. It is necessary also to have an indication of star azimuth, the angle $S_A$ in Fig. 2. This is secured by an indicator 136 connected to the star azimuth shaft 86. Another indicator 137 is connected to the output of amplifier 133. By observation of a selected star the error in the measured distance to the star's geographical position may be ascertained and is attributed to error in present position data. Observation of a second star about 90° in azimuth from the first selection will give a second fix correction at 90° to the first, enabling both latitude and longitude of present position to be corrected.

What is claimed is:

1. A navigation system for a craft comprising, heading means for obtaining an indication of approximate craft heading, astral tracking means, means for directing said astral tracking means toward a selected celestial body, means for obtaining an error signal therefrom the magnitude of which is proportional to the departure in azimuth of said astral tracking means from the true azimuth of said celestial body, means for correcting said approximate craft heading by said error signal to obtain a true craft heading output, triangle solving means having inputs impressed thereon representative of the geographical position of said celestial body and present position of said craft and producing therefrom an azimuth output representative of the azimuth of said celestial body, means for combining said azimuth output and said true craft heading output to produce therefrom a relative bearing output, and means for controlling the bearing of said astral tracking means by said relative bearing output.

2. A navigation system for a craft comprising, heading means for obtaining an output of approximate craft heading, a triangle solving means having inputs impressed thereon representative of the geographical position of a selected celestial body and the present position of said craft and producing therefrom a first output representative of the altitude of said selected celestial body and a second output representative of the azimuth of said celestial body, an astral tracking means, means for adjusting the altitude of said astral tracking means in accordance with said first output of said triangle solving means, means for adding said craft heading output and said second output of said triangle solving means to obtain a celestial body bearing output, means for adjusting the bearing of said astral tracking means by said bearing output, means for obtaining a first error signal from said astral tracking means proportional to the departure in the altitude of said astral tracking means from the true altitude of said celestial body, means for revising said first output of said triangle solver in accordance with said first error signal, means for obtaining a second error signal from said astral tracking means proportional to the departure in azimuth of said astral tracking means from the true azimuth of said celestial body, and means for correcting said approximate craft heading by said second error signal whereby said approximate craft heading is converted to true craft heading.

3. A navigation system for a craft comprising, a directional gyroscope, a gyroscope correction means for supplying earth rate and longitude rate corrections, means for combining the outputs of said directional gyroscope and said gyroscope correction means to produce a shaft rotation proportional to the craft heading, a triangle solving means having inputs impressed thereon representative of the geographical position of a selected celestial body and present position of said craft and producing therefrom a shaft rotation output representative of the azimuth of said celestial body, an astral tracking means, means for combining the craft heading shaft rotation and the celestial body azimuth shaft rotation to produce a shaft rotation representative of the relative bearing of said celestial body, means for controlling the bearing of said astral tracking means thereby, means for obtaining an error signal from said astral tracking means proportional to the departure in the azimuth of said astral tracking means and the true azimuth of said celestial body, and means for applying said error signal to said gyroscope correction means.

4. A navigation system for a craft as set forth in claim 3 in which said triangle solving means additionally produces an altitude output representative of the altitude of said selected celestial body, means for adjusting the altitude of said astral tracking means by said last mentioned output, means for obtaining an error signal from said astral tracking means proportional to the departure in altitude of said astral tracking means from the true altitude of said celestial body, and means for revising the altitude output of said triangle solving means by said last mentioned error signal.

5. A navigation system for a craft as set forth in claim 4 in which said triangle solving means includes at least one resolver the shaft of which is rotated to an angle representative of the altitude of said selected celestial body and in which said last mentioned error signal is impressed on a coil thereof.

6. A navigation system for a craft comprising, a directional gyroscope, a gyroscope correction means for supplying earth rate and longitude rate corrections, means for combining the outputs of said directional gyroscope and said gyroscope correction means to produce a shaft rotation representative of craft heading, a triangle solving means having inputs impressed thereon representative of the geographical position of a selected celestial body and present position of said craft, said triangle solving means including an arc tangent resolving means having a shaft which assumes an angular position representative of the azimuth of said celestial body, a differential operated by the craft heading shaft rotation and azimuth shaft angle and producing therefrom a shaft angle output proportional to the relative bearing of said celestial body, an astral tracking means, means for adjusting the bearing of said astral tracking means by the shaft angle output of said differential, means for obtaining an error signal from said astral tracking means which is proportional to the azimuth departure of said astral tracking means from the true azimuth of said celestial body, and means for applying said error signal to said gyroscope correction means.

7. A navigation system for a craft as set forth in claim 6 in which said triangle solving means includes a second arc tangent resolving means having a shaft which assumes an angular position representative of the altitude of said celestial body, means for adjusting the altitude of said astral tracking means in accordance with the angular position of said last mentioned shaft, means for obtaining an altitude error signal from said astral tracking means which is proportional to the altitude departure of said astral tracking means from the true altitude of said celestial body, and means responsive to said altitude error signal for revising the angular position of the shaft of said second arc tangent resolving means.

8. A navigation system for a craft as set forth in claim 7 in which said altitude error signal is impressed on a coil of said second arc tangent resolving means.

References Cited in the file of this patent

UNITED STATES PATENTS

| | | |
|---|---|---|
| 2,465,624 | Agins | Mar. 29, 1949 |
| 2,553,529 | Dehmel | May 15, 1951 |
| 2,688,440 | Gray et al. | Sept. 7, 1954 |
| 2,758,377 | Claret et al. | Aug. 14, 1956 |
| 2,762,123 | Schultz et al. | Sept. 11, 1956 |
| 2,857,672 | McCoy | Oct. 28, 1958 |